T. FERRY.
Carpet-Cleaner.

No. 218,949.  Patented Aug. 26, 1879.

2 Sheets—Sheet 2.

T. FERRY.
Carpet-Cleaner.

No. 218,949. Patented Aug. 26, 1879.

WITNESSES:
Jas. E. Hutchinson.
Henry C. Hazard

INVENTOR:
Theo. Ferry, by
Prindle & Co. his Attys

UNITED STATES PATENT OFFICE.

THOMAS FERRY, OF WILMINGTON, DELAWARE.

IMPROVEMENT IN CARPET-CLEANERS.

Specification forming part of Letters Patent No. 218,949, dated August 26, 1879; application filed June 13, 1879.

*To all whom it may concern:*

Be it known that I, THOMAS FERRY, of Wilmington, in the county of New Castle and in the State of Delaware, have invented certain new and useful Improvements in Carpet-Cleaners; and do hereby declare that the following is a full, clear, and exact description thereof, reference being had to the accompanying drawings, making a part of this specification, in which—

Figure 1:
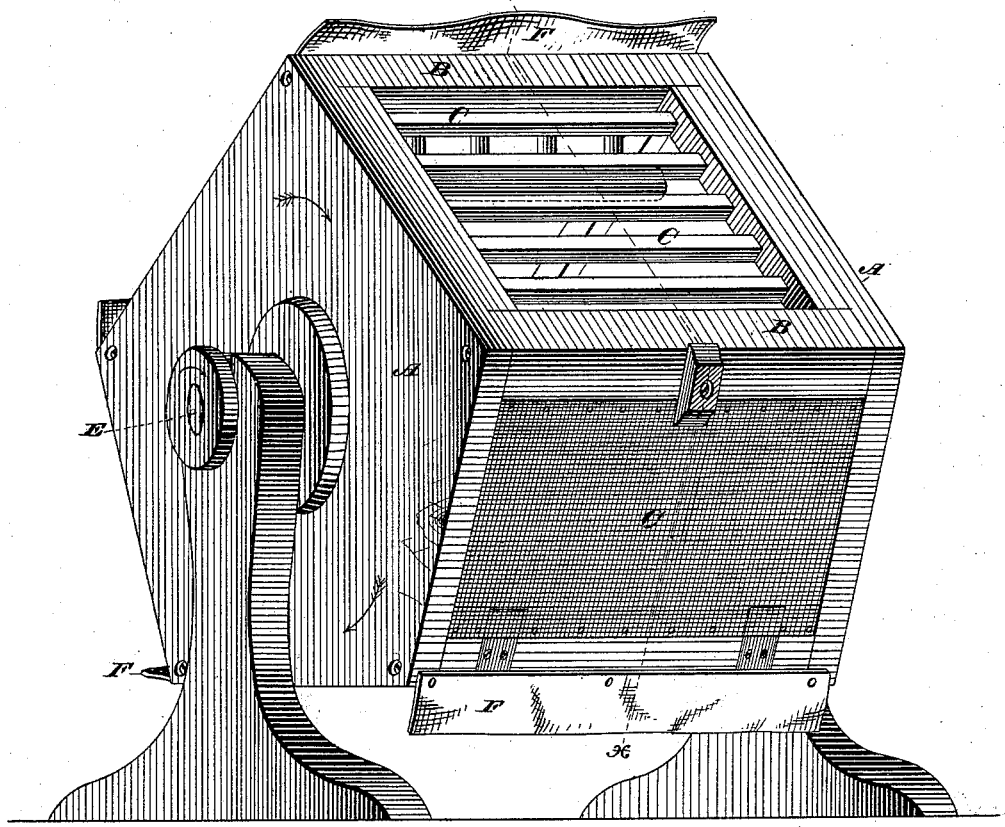
Figure 2:
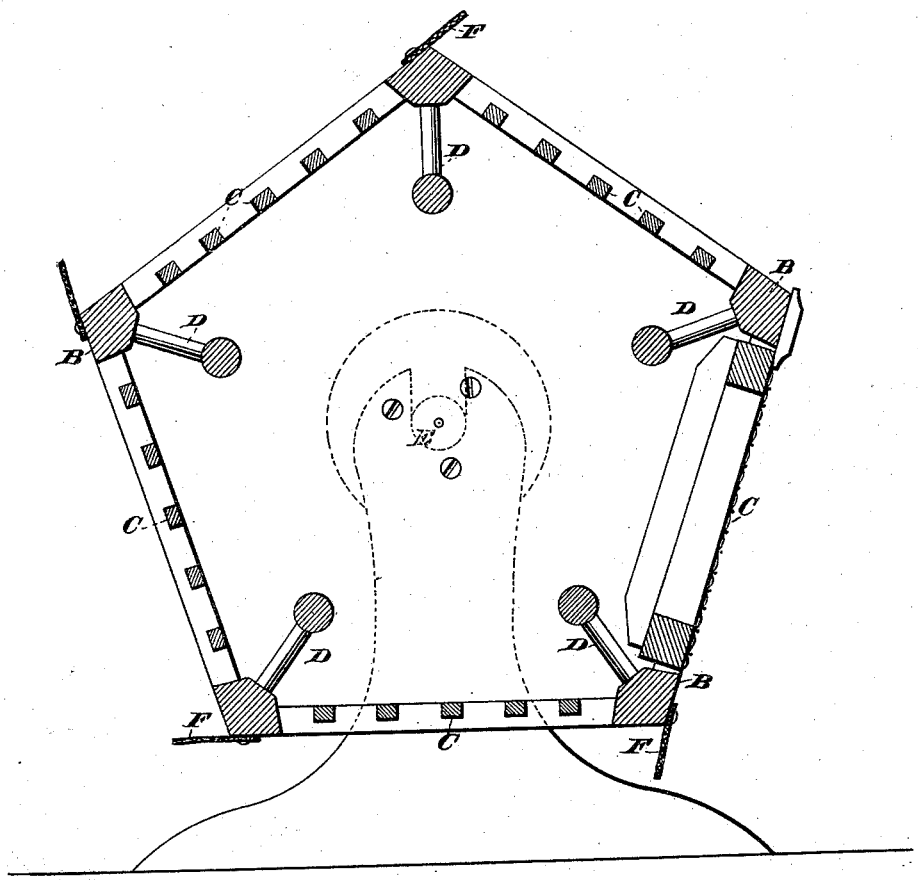

Figure 1 is a perspective view of my machine as arranged for use, and Fig. 2 is a central section of the same upon line $x\ x$ of Fig. 1.

Letters of like name and kind refer to like parts in each of the figures.

The design of my invention is to enable dirt and dust to be removed from carpets without the wear which follows the use of ordinary beating mechanism; and to this end it consists, principally, in combining with the cage or drum peripheral flanges which are arranged at such angles as to cause air to be forced into the interior of said cage by its rotation, substantially as and for the purpose hereinafter shown.

It consists, farther, in the machine as a whole, its several parts being combined to operate in the manner and for the purpose substantially as specified.

In the annexed drawings, A and A represent the ends of my cage, which ends have each, preferably, the form of a pentagon, and are connected together at their points by means of bars B, so as to form the frame of my cage.

Between the bars B each face or panel of the periphery of the cage is inclosed by slats, wire-cloth, or other like means, C, and one of said panels is hinged, or in other manner arranged, so as to permit the same to be partly or entirely removed when desired.

Within the interior of the cage, at each angle of its periphery, is provided a ledge or flange, D, which extends between the ends A and projects radially inward, as seen in Fig. 2. Said ledges have, preferably, a skeleton form.

The cage is now journaled by means of axial bearings E and E, which are attached to its ends A and A, and means provided whereby said cage may be caused to rotate, when the operation of the mechanism is as follows, viz:

a carpet is placed within the cage through the removable panel, said panel closed and said cage caused to revolve. Each ledge engages with and raises said carpet considerably above the axial center of said cage, when it falls downward to the bottom of the latter, to be again raised and permitted to fall, said operation being repeated as long as the rotation of the cage continues.

At each fall of the carpet the concussion causes a portion of the dust contained therein to be loosened and driven outward, while the rolling movement given to said carpet causes a different portion to be exposed at each fall, by which means all dust and dirt are quickly removed and pass outward through the open periphery of the cage.

In order that the dust may be more readily driven out from the cage, I secure to or upon the exterior of the cage, at each angle, a flange, F, which is preferably composed of leather, rubber, or other flexible material, and has such angle with relation to the circle of rotation as to cause air to be gathered inward and forced through the open periphery.

The device thus constructed requires little power, is speedy and effective in its operation, and will thoroughly remove all dust and dirt from a carpet without the slightest injury to the same, however much it may be worn.

Having thus fully set forth the nature and merits of my invention, what I claim as new is—

1. In combination with the pivoted cage or drum described, having an open periphery, the peripheral flanges F arranged to cause air to be forced inward, substantially as and for the purpose shown.

2. The hereinbefore-described carpet-cleaner, in which is combined the journaled cage having an open periphery, the radial, inward-projecting ledges, the peripheral air-gathering flanges, and means whereby said cage may be rotated upon its bearings, substantially as and for the purpose specified.

In testimony that I claim the foregoing I have hereunto set my hand this 15th day of May, 1879.

THOMAS FERRY.

Witnesses:
GEO. S. PRINDLE,
W. J. NEWTON.